Dec. 17, 1968 R. A. SCHNEIDER 3,417,386

MAGNETIC HEAD ASSEMBLY

Filed Oct. 11, 1965 2 Sheets-Sheet 1

INVENTOR.
ROBERT A. SCHNEIDER

BY Christie, Parker & Hale
ATTORNEYS.

INVENTOR.
ROBERT A. SCHNEIDER
BY
Christie, Parker & Hale
ATTORNEYS.

United States Patent Office 3,417,386
Patented Dec. 17, 1968

3,417,386
MAGNETIC HEAD ASSEMBLY
Robert A. Schneider, Arcadia, Calif., assignor to Consolidated Electrodynamics Corporation, Pasadena, Calif., a corporation of California
Filed Oct. 11, 1965, Ser. No. 494,475
12 Claims. (Cl. 340—174.1)

ABSTRACT OF THE DISCLOSURE

A method and apparatus is disclosed for fabrication of a magnetic head which includes high permeability sendust tips housed in slots in the undersurface of tip support plates. The tip support plates are beveled along one length to a depth which exposes a portion of the slots at the upper surface of the plates. The sendust tips are contoured at these exposed portions of the slots for contact with the magnetic tip. Another housing bracket of non-magnetic material is arranged with magnetic circuits housed therein to join with the sendust tips and complete a signal recording and signal recovery magnetic circuit. In one embodiment the undersurface of the support plates is plated with an alloy having wear and abrasive characteristics substantially matched to those of the sendust material. This plated area is located between the adjacent channels formed by sendust tip pairs, and it is also exposed and contoured for contact with the magnetic medium. In another embodiment the entire plate is formed from an alloy having substantially the same wear and abrasive characteristics as the sendust tips.

This invention relates in general to a new and improved head for storing and recovering signals on a magnetic storage medium and to a method of fabrication which yields long wear life. In particular, this invention relates to a stationary head and method of fabrication for a contact surface between the head and storage medium, composed of alternate exposed portions of magnetic and non-magnetic materials each having matched high abrasive resistant characteristics.

Stationary heads today are widely employed in various branches of technology which utilizes storage mediums such as tapes, drums, disks, etc. Certain of these stationary heads in the past have generally included a contact surface in which gapped magnetic circuits were exposed for direct contact with the tape or other storage medium. Continual contact with the storage medium introduces friction and abrasion to the head's surface and as a result of such contact these prior art heads are subject to wear, and frequently must be replaced, on occasions after only a few hundred hours of use. These replacements are objectionable because spare equipment must be provided, and the associated equipment is rendered useless during head replacement operations. In addition, the cost of fabricating such heads is high and frequent replacement is, accordingly, uneconomical and undesirable.

Generally, prior art magnetic materials utilized in such heads are composed mainly of nickel with smaller percentages of iron and molybdenum. Such materials, of which there are many varied types each with different magnetic properties, are relatively soft and have a short wear life. In the past, these materials have been held in supports which are normally constructed of another soft easily machinable non-magnetic material such as aluminum or brass. Such prior art heads thus are a combination of two relatively soft materials which are exposed to continual frictional contact with the storage medium. The end result is an extreme wear and short head life for prior art stationary heads.

An iron, silicon, aluminum alloy developed, in the past, has excellent magnetic characteristics and is available in small ingot forms. One particular alloy of this type is referred to as sendust and has a range composition of 7 to 11% silicon, 4 to 7% aluminum and the balance iron. This material has a hardness of approximately Rockwell C–40 to C–50 and its wearability is far in excess of any other known prior art materials for magnetic recording.

Prior to this invention sendust has not been utilized in a stationary magnetic head for direct contact with a storage medium. Prior art support materials and techniques are unavailable because any magnetic material, such as sendust, if supported in soft non-magnetic material would result in a head which exhibits an undesirable washboard wear pattern. This washboard wear pattern, resulting from the continual contact of the storage medium, would be in the form of uneven troughs at the areas of soft non-magnetic support material, and jagged ridges at the areas of sendust material. Any such head is totally unsatisfactory for reliable and regulated information recovery, because it causes tearing and damage to the storage medium, and distorts tape guiding. Also, the head's life is determined by "wear out" of any surface of the head which contacts the tape and such soft material wears through readily.

I have discovered that sendust material may readily be combined in a contact support surface for a stationary head with a support plate made of a non-magnetic high wear resistant alloy selected from the class of alloys consisting of cobalt-chromium alloys or titanium-aluminum-vanadium alloys. Such alloys, experiments have shown, have a durability and abrasion resistance that is compatible with the magnetic sendust tips. By compatible it should be understood to mean that such alloy materials wear at substantially the same, or slightly less, than the wear rate for sendust. Thus, use of such alloys as a support and contact surface assures reliable transfer of signals between the storage medium and the magnetic circuit; and, at the same time, provides maximum abrasion resistance and long head life. Further, these alloys may be successfully cut and ground with moderate difficulty, and when machined in this manner hold their shape.

The support plates of this invention are durable and are superior to those of the prior art. Fabrication of a head having a contacting surface of comparable wear characteristics for both the magnetic and non-magnetic materials, in accordance with the principles of my invention, is capable of an extended wear life of approximately 3,000 hours or more at high tape speeds of 120 inches per second and considerably longer at slower tape speeds. This wear life thus represents at least an increase in efficiency of approximately 300 to 500% over known prior art stationary heads.

My invention further includes a method of fabrication which comprises the steps of plating a soft easily machinable slotted rectangular plate pair to a predetermined depth with a non-magnetic cobalt, nickel, indium-copper-nickel, tungsten carbide, tungsten-chromium carbide, or titanium base alloy that is characterized by an abrasive resistance comparable to that of magnetic sendust. These plated surfaces are lap ground with relative ease, as it is well known that materials of this type are relatively easy to grind even though the milling or cutting operations for such materials may be more difficult. This grinding operation removes the raised plated channels and exposes the soft support material. This exposed material is milled out to the depth of the adjacent areas of plated alloy material, and sendust tips are inserted in these milled out channels. The support plate pair with these sendust tips in place are next joined at a proper ridged angle on top of a bracket which houses the remainder of magnetic circuits to be completed by the sendust tips. Once assembled, the untreated, soft, non-magnetic surface of the rectangular plate pair is machined by conventional machining along the ridge until the coated alloy and the sendust material is just below the machined surface. Thereafter the head assembly is subjected to a contour lapping operation which removes the remainder of the soft support plate and develops a contoured ridge with alternate exposed areas of magnetic sendust material and non-magnetic plated alloy material. These exposed alternate materials are available for direct contact with the medium and because of their matched wearing characteristics, represent a new and improved head having a wear life superior to any known prior art device.

The foregoing principles and features of this invention may more fully be appreciated by reference to the accompanying drawing in which:

FIGURE 1A depicts a tip support plate with sendust tips housed in slots therein;

FIGURE 1B is a diagrammatic representative of a contour grinding operation;

FIGURE 1C depicts a complete head assembly including a peaked housing bracket with tip support plates in position in accordance with this invention;

FIGURE 2A depicts a tip support plate with raised landings in accordance with another embodiment of the method and apparatus of this invention;

FIGURE 2B is a diagrammatic representation of one plating procedure useful in accordance with this invention;

FIGURE 2C is a diagrammatic representation of a lap grinding operation;

FIGURE 2D depicts the tip support plate of FIGURE 2A with housing slots for the sendust tips in accordance with this invention; and FIGURE 2E depicts the tip support plate of FIGURE 2D with a sendust tips housed therein.

Figure 1A:
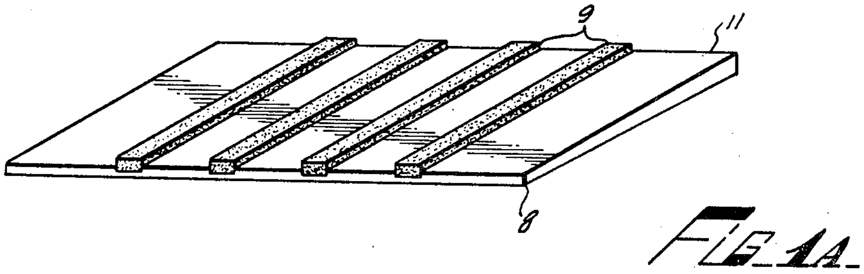
FIGS. 1A, 1B and 1C depict a new head plate in accordance with the principles of this invention.

It should be understood that in its broadest sense my invention comprises a pair of tip support plates such as plate 11 of FIG. 1A. Each plate 11 is slotted and the slots are filled with a magnetic sendust material 9. A detailed description of these slotting operations and one possible head fabricating technique is fully disclosed in another application filed on even date herewith, assigned to the same assignee, and having application Ser. No. 494,765.

Reference may be made to this other application if the details of this head fabrication technique are desired. In general, however, a pair of tip support plates having the magnetic sendust tips cemented in place as shown in FIG. 1A, are subjected to a beveling operation along length 8. These beveled tip support plates are bonded to a ridge-shaped surface of a head support housing 6, FIG. 1C, which houses the remainder of the magnetic circuits.

Figure 1B:
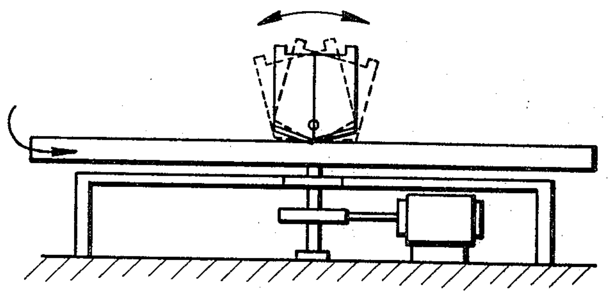

One magnetic circuit provides for each track of information and each magnetic circuit includes a pair of magnetic tips, one each on opposite sides of a gap in the head structure on the storage medium. A head is assembled in the form shown in FIG. 1C and the gapped ridge 7 is present at the peak of the surface which provides for contact with the magnetic storage medium. This gapped ridge 7 is then contour ground in any one of several well-known grinding techniques, a typical one of which is shown in FIG. 1B. This contour grinding operation of FIG. 1B, exposes portions 5 of the sendust tips, FIG. 1C, which previously were located just beneath the upper surface of the beveled edge 8 of both tip support plates 11 and 12. The contour or radius for this grinding operation is chosen to provide a proper angle for contact with the magnetic storage medium which angle assures reliable signal transfer and reduces tape pressure and wear on the head.

The alloys which are characteristic of the tip support plates 11 and 12 of this invention are generally classified by non-magnetic and corrosion resistant qualities. Of the wear resistant alloys mentioned hereinbefore, two have proved to be particularly applicable to the magnetic head of this invention and these two alloys are a cobalt-base and a titanium-base alloy. The cobalt base alloys include a nominal composition of 42% cobalt, 20% chromium, 13% nickel, 2% molybdenum, 3% tungsten and the balance of smaller percentages of carbon, beryllium, manganese and iron. This composition is only typical and in fact the percentages of nickel and iron may be reduced considerably if corresponding increases in chromium are present. For example, an alternative nominal composition includes 47 to 51% cobalt, 30 to 31% chromium, and 4 to 12% tungsten with the remaining material consisting of iron, nickel, silicon and molybdenum in amounts ranging from 1 to 3%. I have also discovered that a titanium base alloy consisting of 88 to 92% titanium and 5 to 7% aluminum and 3 to 5% vanadium is another wear resistant alloy that is readily machinable and has wear characteristics compatible with the magnetic sendust tips.

Figure 1C:
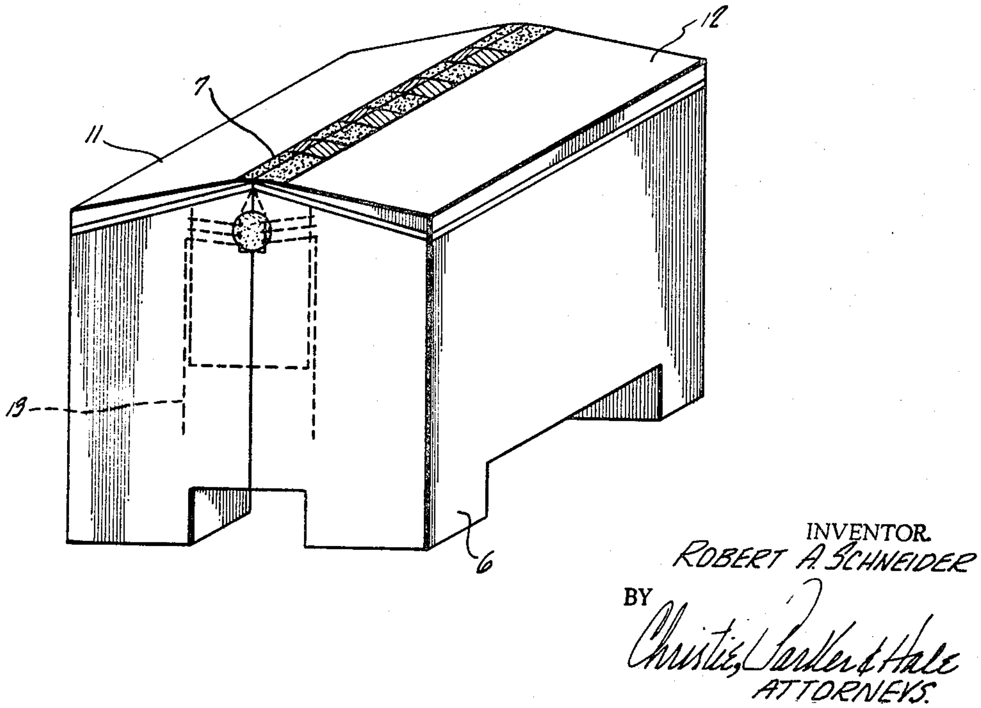

An alternative embodiment of my invention avoids some areas of possible machining difficulties that may be presented by the use of the wear resistant alloy support plates 11 and 12, FIG. 1C, described hereinbefore. In accordance with this alternative embodiment, a soft material support plate is coated with a wear resistant alloy of the classes mentioned hereinbefore. That support plate is thereafter subjected to a method of fabrication and assembly described and depicted in connection with FIG. 2, hereinafter.

Figure 2A:
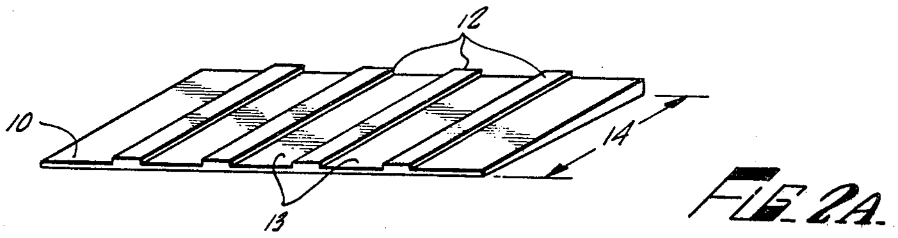
FIGS. 2A, 2B, 2C, 2D and 2E depict a new head plate and a method of plating to expose alternate areas of magnetic and non-magnetic materials characterized by high abrasion resistance for direct contact with a magnetic medium.
Figure 2B:
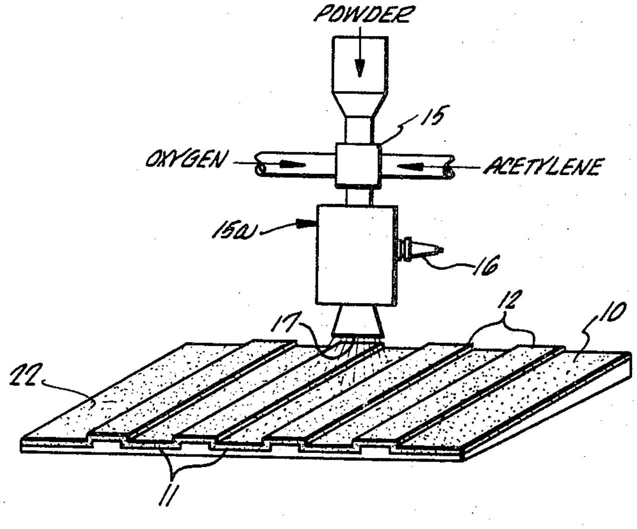

In FIG. 2A one flat rectangular blank 10 is shown. This blank 10, to provide for easy machinability, is chosen of a soft material such as aluminum or brass. Plate 10 has a plurality of parallel slots 13 extending across its width 14. These slots 13 may be milled in plate 10 by any well known machining technique. As shown in FIG. 2A, each pair of alternate slots produces a plurality of raised parallel areas 12 running across the width 14 of plate 10. This milling operation provides as many raised landings 12 as there are information storage tracks provided in the head to be employed with the medium to be read. In the case shown in FIG. 2A, a head plate for a 4-track head is depicted as a typical example.

Plate 10 with raised landings 12 and channels 13, is next subjected to a coating operation whereby a layer of any of the foregoing wear-resistant alloy is deposited on plate 10. Any well-known coating operation including electroless plating and other chemical plating techniques may be employed at this step in the method of fabrication. For example, in FIG. 2B a typical prior art flame plating apparatus is depicted in diagrammatic form. Numerous so-called flame plating apparatus and techniques are known in the art and any one of such techniques would be satisfactory for this invention. Merely by way of example, if a detailed description is required, reference is made to Patent No. 2,714,563 issued Aug. 2, 1955, to R. M. Poorman et al., on a flame plating technique.

These flame plating operations in general include an apparatus having a mixing chamber 15 wherein oxygen, acetylene and a powdered alloy material are combined in proper amounts. This powdered material is chosen in accordance with the principles of this invention from long-wearing alloys such as the foregoing alloys which have a cobalt or titanium base. Once the proper amount of these materials in powdered form is present in the mixing chamber 15 they are introduced into a second mixing chamber shown as 15A. In this second mixing chamber a high voltage spark is applied by a spark plug 16 which spark ignites the mixture and shoots the heated powder particles from the open end of the gun barrel 17 at high velocity onto the surface of plate 10. This flame plating operation is readily controllable to deposit a layer 22 of any desired depth on the slotted surface of plate 10. This alloy layer 22 is readily controllable and may advantageously be approximately ten to twelve-thousandths of an inch thick.

Figure 2C:
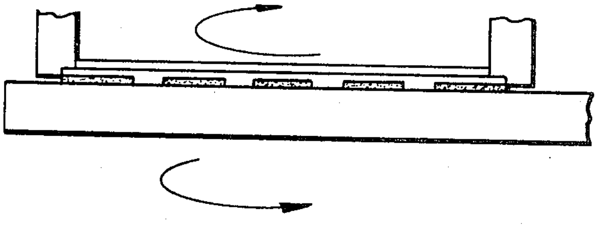
Figure 2D:
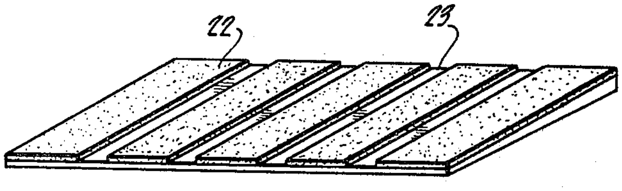
Figure 2E:
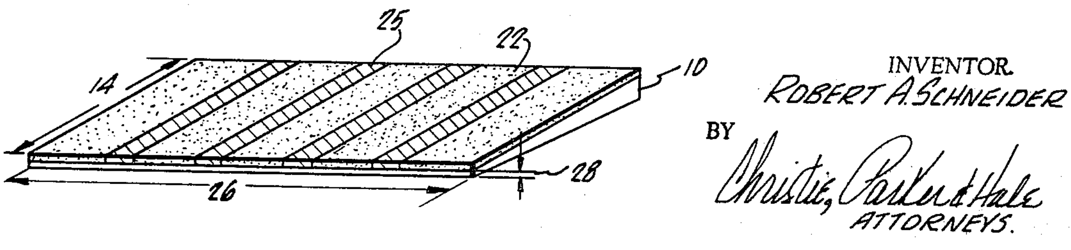

This coated layer 22 of highly wear resistant alloy covers the entire surface of plate 10 and as described hereinbefore this surface has as many raised landings 12 as there are tracks of information on the storage medium. Both this soft machinable support plate 10 and the wear resistant alloy coating 22 are non-magnetic. The next step in the method of this invention is, as shown in FIG. 2C, to remove a portion of these non-magnetic materials by lap grinding the coating of wear resistant material 22 and the raised landings 12, until a flat plane surface is obtained on the treated side of plate 10. This plane surface includes alternating parallel strips of wear resistant alloy plating and portions of the soft non-magnetic support plate material 13. This lap grinding operation may be any one of those well known in the prior art. For example, a typical grinding operation similar to that depicted in FIG. 2C is described in detail in the foregoing referenced patent application.

Thereafter the soft easily machinable plate support material is milled from between the strips of wear resistant alloy. This milling operation is controlled to a depth which is the same as the thickness of the wear resistant alloy layer 22, in the manner shown in FIG. 2D. Each of the recessed channels 23 formed by the milling operation of FIG. 1D are thereafter filled with appropriately sized tips 25 of magnetic sendust material cemented in place in channels 23 in the manner depicted in FIG. 2E. This cement may be epoxy resin or any other suitable bonding agent. This step produces a flat plane surface layer consisting of alternate strips across the width 14 of plate 10 of non-magnetic alloy 22 and magnetic sendust tip material 25 each having matching wear characteristics.

The beveling and contour grinding operations of FIGS. 1B and 1C described hereinbefore in connection with an entire support plate made of wear resistant alloy, may thereafter be utilized to complete the head assembly fabrication. Thus a beveled edge along the length 26 of each one of a pair of tip support plates is provided by matching the untreated side of plate 10. This machining operation involves only the soft support plate material and is therefore readily accomplished with little difficulty and relatively low cost.

In accordance with the method of this invention this beveling operation proceeds only until there remains but a narrow portion 28 of soft support plate remaining above the treated layer of alternate strips of magnetic and non-magnetic materials 25 and 22 respectively. Once the tip support plates have been joined in the manner described hereinbefore in connection with FIG. 1C the gapped ridge 7 is subjected to a contour grinding or lapping operation of FIG. 1B.

It was mentioned hereinbefore that the wear resistant alloy may be ground or lapped more easily than it may be milled or cut. Thus by utilizing the coating operation of this invention, only grinding or lapping operations are involved as far as the wear resistant alloy is concerned. This method thus readily provides a narrow contour of alternate areas of matching wear resistant materials. This contour runs the entire length of the magnetic head for contact with a storage medium. It is highly wear resistant and thus avoids the disadvantages of prior art heads and achieves a superior contact surface and longer head life.

It is to be understood that the foregoing features and principles of this invention are merely descriptive, and that many departures and variations thereof are possible by those skilled in the art, without departing from the spirit and scope of this invention.

What is claimed is:

1. A head for storing and recovering signals from a magnetic storage medium comprising a gapped magnetic circuit of high wear resistant sendust material, and a non-magnetic support means selected to have a high wear resistance substantially equal to that of said magnetic sendust for mounting the gapped portion of the magnetic circuit in a contoured contacting surface, said contacting surface comprising alternate areas of said non-magnetic support material and the magnetic sendust material.

2. A signal storing and recovering head in accordance with claim 1 wherein said support means comprises:

a pair of tip support plates for housing tips of said sendust material in a gapped configuration located in said contacting surface.

3. A signal storing and recovering head in accordance with claim 2 wherein said support plates comprise:

at least a pair of narrow slots in each plate located in the undersurface thereof with one portion of the slots along a beveled length of each plate exposed through the upper surface of the plates to house only an end portion of at least one pair of said tips in a gapped configuration location in said contacting surface.

4. A head for storing and recovering signals in accordance with claim 3 wherein:

said tip support plates consist of a soft easily machinable metal having upper surface portions located between said gapped sendust tips plated with an alloy selected from the class of alloys consisting of cobalt-chromium alloys or titanium-aluminum-vanadium alloys.

5. A signal storing and recovering head in accordance with claim 3 and further comprising:

a non-magnetic housing bracket of shape substantially that of a peaked cube having two intersecting upper surface planes forming a ridge along one portion of the housing bracket;

at least a pair of narrow slots cut in said bracket in parallel planes transversely oriented with said peaked ridge;

a gapped magnetic core of low permeability housed in each slot in the bracket with upper planar edges of the magnetic cores on each side of the gap exposed at and conforming to the upper surface planes of the housing bracket; and means joining said tip support plate pair to the upper surface of the housing bracket with the beveled lengths of the plates located at the peaked ridge and with the exposed lower tip surfaces in contact with the planar edges of the magnetic pole pieces for completing a unitary signal recording and signal recovery magnetic circuit.

6. A head for storing and for recovering signals in accordance with claim 3 wherein:

said tip support plates consist of a non-magnetic alloy selected from the class of alloys consisting of cobalt-chromium alloys or titanium-aluminum-vanadium alloys.

7. A head for storing and recovering signals in accordance with claim 6 wherein:

said alloy selected from said class of cobalt-chromium alloys comprises a nominal composition range of 42 to 51 percent cobalt, 20 to 31 percent chromium, 3 to 12 percent tungsten with the remaining percentage balance selected from the class of materials consisting of nickel, silicon, molybdenum, carbon, beryllium, and manganese.

8. A head for storing and for recovering signals from a magnetic storage medium comprising a magnetic circuit of gapped sendust material having a high abrasion resistance characteristic, and a contoured plane surface for direct contact with the storage medium, said surface including a gapped portion of the magnetic circuit sandwiched between surfaces of a non-magnetic alloy having a high wear characteristic compatible with that of the magnetic circuit, said alloy being selected from the class of alloys consisting of cobalt-chromium alloys and titanium-aluminum-vanadium alloys.

9. A head for storing and recovering signals from a storage medium comprising, a first gapped magnetic sendust material characterized by extreme wear and abrasive characteristics with one portion of the magnetic material on each side of the gap contoured for contact with a magnetic medium, a support bracket for housing a second gapped magnetic material to join with the first magnetic material for completing a magnetic circuit for signal recording and recovery operations, and a separate contoured plate surface mounted on said support bracket for contact with the storage medium, said contoured plate surafce comprising areas of said gapped magnetic material alternating with areas of a non-magnetic material of wear and abrasive characteristics substantially matching that of said gapped magnetic material.

10. A head for storing and recovering signals from a storage medium in accordance with claim 9 wherein said non-magnetic material is a high wear and abrasive resistant alloy selected from the class of alloys consisting of cobalt-chromium alloys and titanium-aluminum-vanadium alloys.

11. A head for storing and recovering signals from a storage medium in accordance with claim 10 wherein said alloy selected from said class of cobalt-chromium alloys comprises a nominal composition range of 42 to 51 percent cobalt, 20 to 31 percent chromium, 3 to 12 percent tungsten with the remaining percentage balance selected from the class of materials consisting of nickel, silicon, molybdenum, carbon, beryllium, and manganese.

12. A head for storing and recovering signals from a magnetic storage medium comprising:

a non-magnetic housing bracket of shape substantially that of a peaked rectangular cube having two upper surface planes forming a ridge along the peaked length of the bracket;

at least a pair of narrow slots cut in said bracket in parallel planes transversely oriented with said peaked length;

a gapped magnetic core of low permeability housed in each slot in the bracket with upper edges of the magnetic cores on each side of the gap exposed at the upper surface planes of the housing bracket;

a pair of flat beveled non-magnetic rectangular plates each having in the undersurfaces thereof at least a pair of slots alignably matching the slots in the housing bracket with one portion of the slots along a beveled length of each plate exposed through the upper surface of the plates;

magnetic sendust tips of high permeability seated in each slot in the plates with an upper portion of each tip exposed at said slot exposures in each plate and contoured for contact with a magnetic medium, said sendust tips further having lower tip surfaces exposed along the undersurface of said support plates; and means joining a tip support plate to the upper surface of the housing bracket with the beveled lengths of the plates forming a gapped ridge and with the exposed lower tip surfaces in contact with the magnetic pole pieces for completing a unitary signal recording and signal recovery magnetic circuit, the plate including areas adjacent the exposed sendust tips having a wear characteristic substantially matching that of the sendust tips.

References Cited

UNITED STATES PATENTS

| | | | |
|---|---|---|---|
| 2,992,474 | 7/1961 | Adams et al. | 179—100.2 |
| 2,922,231 | 1/1960 | Witt et al. | 340—174.1 |

BERNARD KONICK, *Primary Examiner.*

A. I. NEUSTADT, *Assistant Examiner.*

U.S. Cl. X.R.

179—100.2; 346—74; 29—603